Aug. 4, 1964  C. L. GILES  3,143,678
VACUUM ION GAUGE
Filed Dec. 5, 1961

Charles L. Giles,
INVENTOR

BY.

ATTORNEY.

United States Patent Office 3,143,678
Patented Aug. 4, 1964

3,143,678
VACUUM ION GAUGE
Charles L. Giles, Carlsbad, Calif., assignor to Hughes Aircraft Company, Culver City, Calif., a corporation of Delaware
Filed Dec. 5, 1961, Ser. No. 157,076
6 Claims. (Cl. 313—7)

This invention relates to vacuum gauges and more particularly to apparatus for the measurement of the gas pressure in a high vacuum system by means of the phenomenon of ionization.

Ionic vacuum gauges are well known for the purpose of monitoring the pressure of gas in an evacuated system such as a traveling wave tube, for example, where a vacuum of the order of $10^{-9}$ mm. Hg may be required. Gauges for measuring such vacuums are commonly attached to the tube at the time of evacuation thereof so that the vacuum therein may be continuously monitored during operation. Such monitoring is required because gas is often continuously evolved from the relatively complex and extensive structures employed in such tubes during the life thereof. The gauge comprises a "cold" cathode for establishing by field emission a source of electrons which are accelerated toward an anode member. By means of a magnetic field these electrons are caused to travel in spiral paths to enhance the collision thereof with molecules of any gas that might be present. These collisions produce or result in positively charged (ionized) molecules which are then attracted and accelerated toward the cathode on which they impinge. This ion current, having a direct relationship to the pressure of any gas in the system, may be measured to give a very accurate determination of the gas pressure.

Heretofore in vacuum ion gauges comprising a pair of cathode plates within which a circular anode member was disposed, uniformity of the spacing between the cathode plates and the anode was ignored, at least as far as the significance thereof to efficient operation of the gauge was concerned. Likewise, little or no attention has been given to the effect on electron focusing of the width or extent of the gap between two or more anode plates. Hence, previous gauges have been characterized by a non-linearity of ion current versus pressure as well as a failure to produce any ionization whatsoever at low pressures, the measurable range of pressure being to about $10^{-6}$ mm. Hg.

It is therefore an object of the present invention to provide an improved ionic vacuum gauge.

Another object of the invention is to provide an improved ionic vacuum gauge which, having a linear ion current versus pressure characteristic is capable of operating at pressures lower than $10^{-6}$ mm. Hg.

These and other objects and advantages of the invention are realized by providing an ion gauge in which at least the surface of the cathode adjacent the anode is flattened or made straight so that portions of the cathode are substantially parallel to the edges of the anode nearest the cathode. Alternatively, the anode member may be provided with curved edges so that the distance between these edges and a curving cathode surface may be uniform. In addition to improving the ion current linearity versus pressure, the arrangement of the ion gauge, according to the present invention, permits the attainment of a more uniform electric field between the anode and cathode, and better electric and magnetic focusing of the electrons so that the length of the electron flight path therebetween may be substantially increased. According to another feature of the invention, an anode member, comprising at least a pair of spaced plates, which may be electrically joined at their ends, is provided and a ratio of not less than 2:3 maintained or established between the width of the anode plates to the space between the plates. This arrangement has been found necessary in order to achieve good focusing of electrons. The employment of a cathode having flattened portions also permits the use of magnets of lower mass and size.

The invention will be described in greater detail by reference to the drawings in which.

Figure 3:
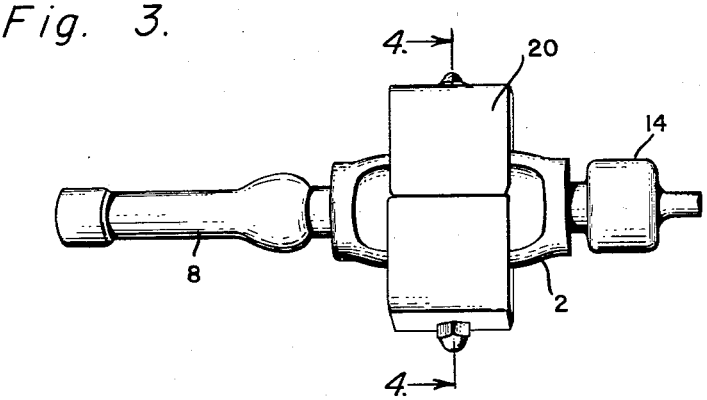
FIGURE 3 is a perspective view of the ion gauge according to the present invention.
Figure 1:
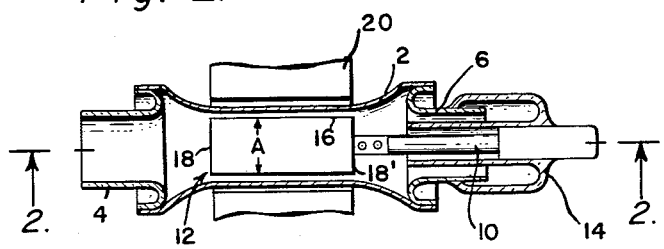
FIGURE 1 is a cross-sectional view in elevation of an ion gauge structure according to the invention.
Figure 2:
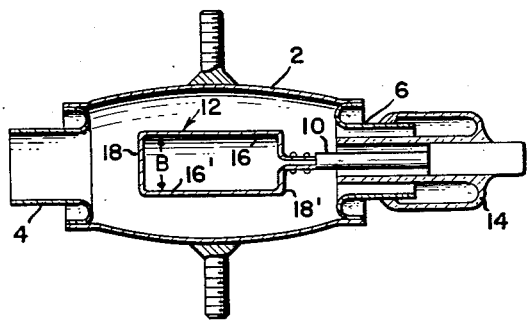
FIGURE 2 is a cross-sectional view of the structure shown in FIGURE 1, taken along the line 2—2 thereof.
Figure 4:
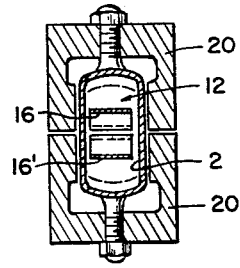
FIGURE 4 is a cross-sectional view in elevation of the structure shown in FIGURE 3, taken along the line 4—4 thereof.

Referring now to FIGURES 1 and 2, an ion gauge structure is shown comprising a partially cylindrical or tubular cathode member 2 which may also perform the function of an envelope for the gauge. The ends of the cathode envelope member 2 are provided with metal end caps, 4 and 6, which may be welded or otherwise hermetically joined thereto. The cap 4 is provided so that the gauge may be connected to a vacuum system whose pressure it is desired to monitor. Thus glass tubulation 8, as shown in FIGURE 3, may be sealed to the end cap 4 and connected to a vacuum system. Mounted within the other end cap 6 is a shaft 10 of electrically conductive material for supporting and providing electrical connection to the anode assembly 12. The shaft 10 is hermetically fused or sealed to the end cap 6 by means of a high voltage glass insulator 14. The anode assembly 12 comprises a continuous rectangular metallic plate formed so as to have a pair of elongated parallel side wall sections 16, 16' separated from each other by the short end wall sections 18, 18', one of the end wall sections (18') being formed by the ends of the plate and secured to the anode shaft 10. The anode assembly 12 may be viewed as a loop formed by a plate so that the loop has depth in one plane (in contrast to a loop of wire which for purposes of explanation herein may be said to have no depth in any plane).

According to the invention the cathode number 2 is formed so that the portions thereof adjacent the open ends (and hence the edges) of the anode assembly 12 are flat or parallel to the ends of the walls 16, 16' of the anode assembly. As shown in the drawings, this permits a C-shaped magnet 20 to be brought in much closer to the cathode and anode, thereby decreasing the magnetic gap. In addition, the space or gap, which may be about an eighth of an inch, between the cathode 2 and the edges of the anode plates 16, 16', is substantially uniform. The net result of these features is to provide improved electric and magnetic focusing and control of the electrons moving between the cathode and the anode.

According to another feature of the invention the ratio of width of the anode plates 16, 16' (dimension A in FIGURE 1) to the space between these plates (dimension B in FIGURE 2) should be at least 2:3 to provide good electron focusing. Thus the anode plates 16, 16' may be, for example, about one inch long and three-eighths of an inch wide, the ends 18, 18' being three-eighths of an inch wide and about one-half inch long (thus providing an opening or space width between the long plates of about one-half inch).

A gauge having such dimensions may be operated by establishing a potential difference between anode and cathode of from 2000 to 3000 volts and a magnetic field of 1500 to 2000 gauss. Such a gauge has been employed to successfully measure pressures of $10^{-9}$ mm. Hg in comparison with pressures of only $10^{-6}$ mm. Hg previously obtainable before the present invention. In addition, the current-pressure function is markedly more linear than heretofore. The use of substantially lighter magnets is also permitted by utilization of the features of the present invention, a weight reduction of at least about two and a half pounds having been achieved with a gauge of the size described herein.

There thus has been described a novel and useful ionic vacuum gauge which is smaller and lighter, with a more linear current-pressure function, and capable of operating at much lower pressures than heretofore with gauges of this type.

It will be appreciated that the foregoing description has been predicated on an embodiment employing substantially rectilinear anode plates. For this reason the cathode has aptly and clearly been described as having those portions flat which are adjacent the edges of the anode plates, thus rendering these anode-adjacent portions of the cathode parallel to the edges of the anode plates. It should be understood, however, that the practice of the invention is in no way limited to the employment of rectilinear geometric shapes. The anode plates thus could be circular or hexagonal, for example. Whatever the shape of the anode elements, according to the present invention the space between the edges of anode elements and the cathode should be substantially uniform. Hence the cathode should be so shaped to provide such uniform spacing, or, in other words, the portions of the cathode nearest the anode elements should be parallel thereto or constantly spaced therefrom.

Likewise, where other than rectilinear anode shapes are employed, it may be confusing or inappropriate to refer to the ratio between the spacing between anode plates and the width of these plates. Since the width of a rectangular anode plate is defined by the extent of a plane away from the edge portions thereof nearest the cathode, it should be understood that in the case of a circular anode, for example, the diameter of such circular anode likewise defines the extent of the anode away from these edge portions. Hence the aforementioned ratio may be expressed as the ratio of the space between the anode elements and the distance which the plane of the anode elements extends away from edge portions thereof nearest the cathode.

What is claimed is:

1. Ionic vacuum apparatus comprising a tubular cathode member having opposed flattened wall sections, spaced planar anode elements disposed within said cathode member, the edge portions of said anode elements nearest said flattened wall sections of said cathode member being substantially uniformly spaced therefrom, the ratio of the distance between said edge portions to the spacing between said anode elements being at least 2:3, and magnetic means disposed externally of said cathode member for establishing a magnetic field between said cathode member and said anode elements.

2. Ionic vacuum apparatus comprising a tubular cathode member having substantially flattened opposed wall sections, spaced planar anode elements disposed within said cathode member and having a predetermined length and width, the edge portions of said anode elements nearest said opposed wall sections of said cathode member being substantially uniformly spaced therefrom, the ratio of the width of said anode elements between said edge portions thereof to the spacing between said anode elements being at least 2:3 and magnetic means disposed externally of said cathode member for establishing a magnetic field between said cathode member and said anode elements.

3. The invention according to claim 2 where said anode elements are rectangular plates.

4. Ionic vacuum apparatus comprising a substantially tubular cathode member, and spaced rectilinear planar anode elements disposed within said cathode member, portions of said cathode member adjacent edge portions of said anode elements being substantially flat whereby the spacing between said edge portions and said cathode member is substantially uniform, and magnetic means disposed externally around said cathode member for establishing a magnetic field between said cathode member and said anode elements.

5. The invention according to claim 4 wherein the ratio of the distance of said anode elements between said edge portions thereof to the spacing between said anode elements is at least 2:3.

6. Ionic vacuum apparatus comprising a tubular cathode having opposed flattened wall sections, an anode member including at least a pair of spaced planar and parallel elements disposed within said cathode member, the edge portions of said spaced planar elements nearest said flattened wall sections of said cathode member being substantially uniformly spaced therefrom, the ratio of the distance between said edge portions of each of said spaced planar elements to the spacing between said spaced planar elements being at least 2:3, and magnetic means disposed externally of said cathode member for establishing a magnetic field between said cathode member and said anode elements.

References Cited in the file of this patent

UNITED STATES PATENTS

| | | |
|---|---|---|
| 2,490,468 | Picard | Dec. 6, 1949 |
| 2,758,232 | Fox | Aug. 7, 1956 |
| 2,993,638 | Hall et al. | July 25, 1961 |
| 3,044,012 | Zito et al. | July 10, 1962 |
| 3,051,868 | Readhead | Aug. 28, 1962 |
| 3,094,639 | Jepsen | June 18, 1963 |

FOREIGN PATENTS

| | | |
|---|---|---|
| 1,027,359 | France | Feb. 18, 1953 |